May 19, 1959 W. C. McNABB 2,887,015
METHOD OF SHAVING CONICAL INVOLUTE GEARS
Filed Jan. 30, 1956
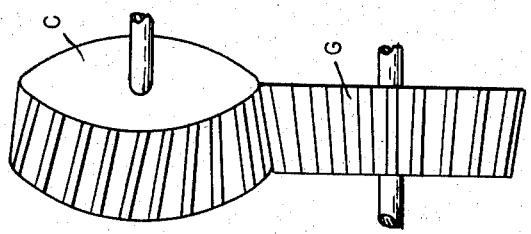
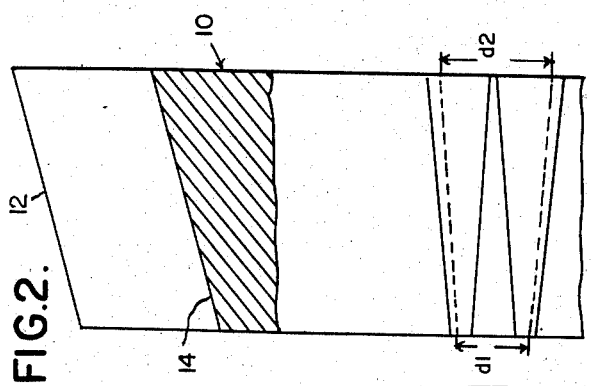
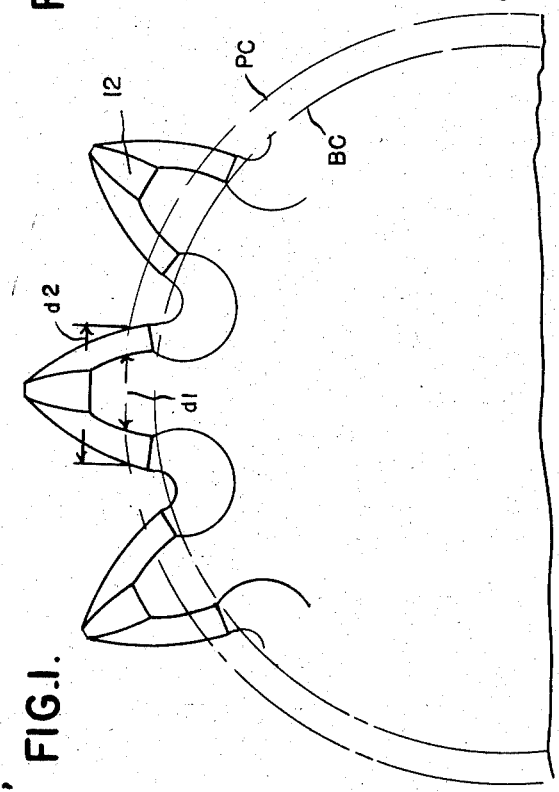
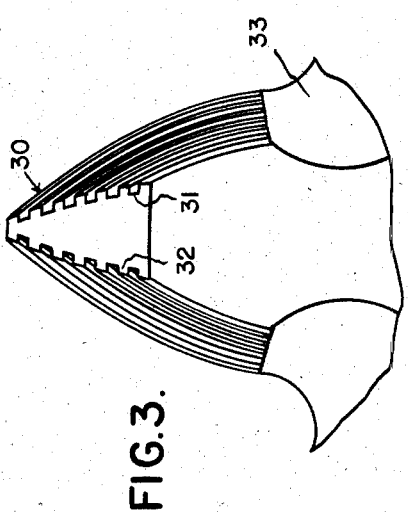
*INVENTOR.*
WARREN C. McNABB
BY *Whittemore,*
*Hulbert & Belknap*
ATTORNEYS

United States Patent Office 2,887,015
Patented May 19, 1959

---

2,887,015

METHOD OF SHAVING CONICAL INVOLUTE GEARS

Warren C. McNabb, Detroit, Mich., assignor to National Broach & Machine Company, Detroit, Mich., a corporation of Michigan Application January 30, 1956, Serial No. 562,062

7 Claims. (Cl. 90—1.6)

---

The present invention relates to a method of shaving conical involute gears.

It is an object of the present invention to provide a method of shaving conical involute gears which produces gears having teeth which are involutes of the same base circle in all cross-sectional profiles, and which further mate with a similar part or with the corresponding rack.

It is a further object of the present invention to provide a method for shaving conical involute gears which comprises meshing them with a conjugate conical involute cutter with the cone angles of the gear and cutter facing in opposite directions so that the axes of the gear and cutter are parallel to a reference plane, the teeth of the gear and cutter being of different helix angles so that they mesh with the axes of the gear and cutter inclined at an angle of between three and thirty degrees, driving either the gear member or cutter member directly and driving the other member through their meshing engagement, effecting traverse in a direction perpendicular to the axis of the gear, and preferably reversing the direction of rotation and the direction of traverse to bring the members out of mesh.

Other objects and features of the invention will become apparent as the description proceeds, especially when taken in conjunction with the accompanying drawings, wherein:

Figure 1 is a front elevational view of a conical involute gear.

Figure 2 is a side elevational view, partly in section, of the gear shown in Figure 1.

Figure 3 is a fragmentary elevational view of a tooth of a cutter formed in the shape of a conical involute gear.

Figure 4 is a diagrammatic view illustrating a conical involute gear and cutter in mesh during the shaving operation.

Conical involute gears have a number of properties which render them particularly desirable for certain applications. However, prior to the present invention it has been impossible to produce such gears by a gear shaving operation while preserving the desired operating characteristics thereof.

A typical conical involute gear may be produced by conventional hobbing, modified only in that during the time when the cutting operation is being extended from one side of the gear blank to the other, there is a relative radial depth feed which produces tooth spaces of gradually tapering depth. It will be appreciated of course that there are limits determined by the desired cone angle and the face width of the gear, but within these limits a conical involute gear may be produced either by providing for the usual hob travel along a path inclined toward the axis of the gear or by providing independent means effecting a uniform radial infeed between the hob and gear blank in timed relation to the usual traverse. The cone angle of the resulting gear is equal to the angle between the axis of the gear blank and the path of relative traverse between the gear blank and tool.

Obviously, this operation may be carried out on a truly cylindrical gear blank, in which case the overall dimensions of the so-called conical involute gear will remain cylindrical. In other words, it is not necessary to provide that the tops of the teeth occupy a truly conical surface. On the other hand, the operation in producing conical involute gears which has been described above, necessarily results in an arrangement in which the bottoms of the tooth spaces all occupy a true conical surface. Accordingly, if the teeth are formed on a cylindrical blank which is not thereafter modified, the teeth are of greater height at one end than at the other.

However, the essential features of the gear teeth which enter into their operation with other gear teeth is the actual form of flanks or sides of the gear teeth.

As a result of the hobbing operation the gear teeth if measured along a line parallel to the axis have less thickness at the side of the gear where the tooth spaces are cut to the greatest depth. As a corollary, at this side of the gear, the tooth spaces are correspondingly wider.

In Figures 1 and 2 there is illustrated a conical gear in which the cone angle is relatively large and the distinguishing characteristics of the conical gear are therefore exaggerated. The gear 10 illustrated in these figures is shown with the top surfaces 12 of the teeth inclined at the cone angle as determined by the inclination of the bottoms 14 of the tooth spaces. The thickness of the gear teeth measured along a path at a constant radius from the center of the gear, as for example at the pitch circle PC, varies from the dimension $d1$ at the small end of the gear to the dimension $d2$ at the large end of the gear.

It is a property of conical involute gears that the involute surface thereof as measured in any plane perpendicular to the axis, is an involute of the same base circle, the only difference in the involutes as measured at different points between the ends of the gear being the spacing of the portion of the involute from its base circle. The base circle or cylinder is indicated in these figures as BC.

Since the conical involute gear may be generated from a conventional rack as described above, it necessarily follows that the teeth thereof are conjugate to the rack of which the hob is an equivalent. It also follows of course that the conical involute gear may therefore mesh with and be conjugate to an ordinary spur or helical cylindrical gear, which in turn is conjugate to the same rack. As a further corollary, it follows that one conical involute gear produced by a hob will be conjugate to all conical involute gears produced by the same hob. However, another unique feature of conical involute gears is that they may be meshed with the corresponding ends of the gear teeth together or with the corresponding ends of the gear teeth opposite to each other. In the first case, the axes of the conical involute gears, if the teeth are of the same nominal helix angle, are inclined and intersect at an angle equal to the sum of the cone angles of the gears. Under these conditions however, while the teeth of the set of conical gears are conjugate, contact between the engaging surfaces of the gear teeth is limited to a point in theory, and in practice is limited to a small zone. However, if the conical involute gears are meshed with the corresponding ends of the teeth disposed opposite to each other, and if the helix angles and cone angles of the teeth are the same, then the two conical involute gears operate with their axes parallel, and in this case line contact between the teeth takes place. It is of course recognized that conical gears of different cone angle may be conjugate to each other, and meshed with each other with the big ends thereof together or opposite each other.

While the teeth of a conical involute gear may be made conjugate to the teeth of an ordinary spur or helical cylindrical gear, the contact between the teeth of the cylindrical gear and conical involute gear if the teeth are unmodified, results in theoretical point contact. Accordingly, efforts to shave the teeth of a conical involute gear with an unmodified cylindrical gear shaving cutter results in the production of teeth on the conical involute gear which have a hollow lead modification as measured parallel to the axis. Two conically involute gears, both having hollow lead modification cannot operate together satisfactorily with their axes parallel since the contact between the teeth thereof is limited to end contact.

It has been found that if a gear shaving cutter is produced in the form of a conical involute gear having the same gear characteristics as the conical involute gear to be shaved, a conical involute gear may be shaved thereby and the result will be to produce conical involute teeth all profiles of which are involutes of the same base circle and which exhibit true lead showing tapered teeth having a thickness which varies uniformly from end to end as measured parallel to the axis. This is theoretically true; however, deviations from a true lead are possible under certain degrees of crossed axes, such as a slight crowned lead. It will be understood that the hollow lead modification referred to identifies teeth in which the variation in tooth thickness from end to end is not uniform as measured parallel to the axis.

In order to carry out the successful gear shaving operation, the gear shaving cutter is placed in mesh with the conical involute gear with the thick ends of its teeth at the side of the conical involute gear having the thin ends of its teeth. With the parts in mesh, either the gear or cutter is rotated directly and the other of the two members is driven by the meshed engagement between the parts. The teeth of the conical involute cutter are formed to extend at a helix angle so as to mesh with the teeth of the conical involute gear with the axes of the gear and cutter crossed in space at an angle between three and thirty degrees.

Due to the tapered shape of the meshing teeth, the relative traverse which is required to produce completely machined teeth on the conical gear from end to end thereof is carried out in a direction perpendicular to the axis of the conical involute gear. In this operation the amount of material removed in a machining operation is determined by the total spacing of the axes of the gear and cutter from the reference plane which is parallel to both of these axes or in other words, by the minimum operating center distance. With the gear and cutter in loose mesh but with the axes spaced at a predetermined distance from the reference plane, rotation is initiated and traverse parallel to the reference plane and in a direction perpendicular to the axis of the gear is commenced. This is equivalent to a depth feed as the gear moves through a zone of maximum cutting as determined when the instantaneous location of the common normal to the axes of the gear and cutter intersects both. Traverse which takes place after this common normal has shifted beyond one end of the conical involute gear results in bringing the gear and cutter again into loose mesh.

For best results the complete machining operation comprises a first cutting stroke while the parts are rotated in a direction to give a conventional cut. Thereafter, a finishing stroke is taken by reversing the direction of relative traverse and reversing the direction of rotation of the gear and cutter.

In a successful practice of the present invention a 14-tooth spur conical involute gear of 5 D.P., 22°30′ P.A. with a generating P.A. of 22°40′28.5″ and a generating cone angle of 7°30′ was successfully shaved. The shaving cutter was hobbed on the same fixture used to hob the conical involute gear and had the same cone angle of 7°30′. The gear shaving cutter was provided with serrations as best illustrated in Figure 3, these serrations extending up and down the sides of the teeth in planes perpendicular to its axis and leaving therebetween ribs having sharp cutting corners. A tooth of the cutter is illustrated at 30 in Figure 3, the grooves or channels being shown at 31 and the intermediate ribs at 32. Adjacent the roots of the teeth they are undercut as indicated at 33 to provide arcuate channels. Due to the tapered relationship of the teeth and tooth spaces, the channels 33 are preferably of conical form.

Referring now to Figure 4 there is illustrated the meshed relationship between a gear G and a cutter C. In this case both the gear and cutter are of conical involute type and for purposes of illustration, they are shown with the tops of the teeth extending parallel to the bottoms thereof so as to produce an outside conical shape of the gear and cutter. The gear is shown with its axis horizontal and the cutter C has its axis located in a horizontal plane. However, the teeth of the cutter are disposed at a right hand helix angle as illustrated in the figure, and accordingly, the axis of the cutter C is inclined to the plane of the figure. The gear and cutter may be brought into mesh with the gear directly under the cutter and the gear then elevated until it is in tight mesh with the cutter. Thereafter, the gear may be traversed horizontally in a direction perpendicular to its axis to a point in which the gear and cutter are in loose mesh. Thereafter, the gear may be further elevated to a position in which it will be in interference if traversed back to a position directly beneath the cutter. This additional upfeeding of the gear determines the amount of stock which will be removed by the initial traverse cut. Thereafter, the gear and cutter are rotated in mesh at substantial speeds as for example a surface speed of 250 feet per minute, and the relative traverse perpendicular to the axis of the gear and in a plane parallel to the axes of both gear and cutter is caused to take place at a slow feeding speed. As the gear passes beneath the cutter a line perpendicular to both the axes of the gear and cutter is caused to shift from one side of the gear to the other and this is turn determines the zone of maximum cutting. Preferably, after the first cutting stroke, the direction of rotation of the gear and cutter is reversed and the direction of relative traverse is also reversed. At this time a slight additional upfeed of the gear may be provided if desired.

Inasmuch as the direction of traverse extends at only a small angle to the plane of the cutter, it is desirable to insure that cutting edges on successive teeth of the cutter are not in exact alignment. This may readily be accomplished by providing the corresponding serrations on the teeth of the cutter in helical relationship extending around the periphery of the cutter.

The method as so far described results in the production of unmodified teeth on the conical involute gear. Such teeth have profiles which are involutes of the same base circle as measured in any plane perpendicular to the axis thereof. Opposite sides of the teeth as measured along a path at constant radial distance from the axis thereof shows a true lead. Due to the tapered nature of the teeth however, it will of course be appreciated that the leads at opposite sides of the teeth are different. Thus for example, in a so-called spur gear, the lead at one side thereof will be at a small left hand helix angle while the opposite side will extend at an equal right hand helix angle.

If it is desired to impart modification to the teeth of the involute gear, such modification may be provided by making a corresponding modification to the teeth of the conical involute cutter. Thus for example, if it is desired to produce a slight longitudinal crown, an opposite modification may be imparted to the teeth of the conical involute cutter.

While a typical and successful shaving operation has been described in some detail, certain variations in the method may be practiced which in some cases will produce different but desirable results.

In the first place, it is recognized that with a conical involute gear and cutter in mesh with the cone angles thereof facing in the opposite direction, any relative movement between the parts having a component parallel to the axis of the gear tends either to move the teeth into clearance or into a cramped condition. It is for this reason that in the specific example described in the foregoing, relative traverse was described as in a direction occupying a plane parallel to the axes of both the gear and cutter and perpendicular to the axis of the gear. However, if traverse is inclined at a very small angle to the path perpendicular to the axis of the gear, and at the side of such path tending to produce cramping or interference between the teeth of the gear and cutter, and if the gear and cutter are rotated at cutting speeds during slow traverse in such direction, it will be apparent that the component of this traverse parallel to the axis of the gear may be considered as equivalent to a depth feed. It will also be apparent that since in a gradual depth feed which is continuous throughout the duration of a cutting stroke, it tends to produce a greater depth of cut at the side of the gear which is being machined at the end of the stroke. This fact may be taken into consideration during design of the cutter and calculations for proper setup between the gear and cutter.

In the previously described specific practice of the invention, it was further pointed out that if the cone angles of the gear and cutter were identical and the gear and cutter were reversed, the axes of the gear and cutter were both parallel to a reference plane and were inclined to each other by an amount determined by the difference in helix angle between the teeth of the gear and cutter. The operation described with this arrangement produced teeth on the conical involute gear which had a true lead.

It was also pointed out that if the operation were carried out with a cylindrical cutter, the teeth of the conical involute gear were given a hollow lead modification. A cylindrical cutter may be considered as a conical involute cutter having a cone angle of zero degrees. Accordingly, if a conical involute cutter having an actual cone angle less than the cone angle of the conical involute gear were employed, it would produce a hollow lead modification on the teeth of the conical involute gear, the amount of such modification being dependent upon the relationship between the cone angles of the gear and cutter, and approaching zero hollow lead modification as the cone angle of the cutter approaches the cone angle of the conical involute gear. In some cases it may be desirable to provide a certain amount of hollow lead modification and in accordance with the foregoing, this can be controlled by selecting the proper cone angle of the conical involute cutter. It will of course be appreciated that if a conical involute cutter having a cone angle different from that of the gear is employed, it will necessarily be meshed therewith with its axis in an angular relationship determined by two factors. In the first place, the axis of the cutter will be inclined in a first plane by an angle determined by the difference of angularity of the cone angles. In the foregoing, the cone angle of the cutter is the operating cone angle and is a function of operating pressure. Accordingly, as the cutter is reground and its operating pressure angle is reduced, the operating or effective cone angle is increased. The axis of the cutter will be additionally inclined in a plane perpendicular to the first mentioned plane by an angle determined by the difference in helix angle between the teeth of the gear and cutter.

The drawings and the foregoing specification constitute a description of the improved method of shaving conical involute gears in such full, clear, concise and exact terms as to enable any person skilled in the art to practice the invention, the scope of which is indicated by the appended claims.

What I claim as my invention is:

1. The method of producing conical involute teeth on a gear member by placing it in mesh with a conical involute gear-like cutter member having cutting edges on its teeth disposed in planes perpendicular to its axis, the cutting edges which are most nearly circumferentially aligned extending at a small helix angle around said cutter member, with the large end of the teeth of said cutter member adjacent the small end of the teeth of said gear member, directly driving one of said members in rotation and thereby driving the other of said members at cutting speed, and relatively traversing said members in a direction generally perpendicular to the axis of said gear member and generally tangentially of said cutter member.

2. The method of claim 1 in which the cone angles of said members are equal.

3. The method of claim 2, the teeth of said members having different helix angles so that said members mesh with their axes parallel to a common reference plane, and crossed by an amount equivalent to the difference in helix angle.

4. The method of claim 1 in which the relative direction of traverse is inclined from perpendicular to the axis of said gear member in a direction to cramp the teeth of said members.

5. The method of claim 1 in which the cone angles of the two members are unequal.

6. The method of finishing a conical involute gear member which comprises placing it in mesh with a conjugate involute cutter member with the wide end of the cutter teeth adjacent the narrow end of the gear teeth, the gear and cutter members having the same cone angle and the axes of said gear and cutter members being parallel to a reference plane, the teeth of said members being of such helix angle that the axes of said members cross at an angle of three to thirty degrees, driving one of said members directly in rotation and driving the other member thereby, and effecting relative traverse between said members in a direction parallel to said reference plane and perpendicular to the axis of said gear member.

7. The method of finishing a conical involute gear member which comprises placing it in mesh with a conjugate involute cutter member with the wide end of the cutter teeth adjacent the narrow end of the gear teeth, the gear and cutter members having the same cone angle and the axes of said gear and cutter members being parallel to a reference plane, the teeth of said members being of such helix angle that the axes of said members cross at an angle of three to thirty degrees, driving one of said members directly in rotation and driving the other member thereby, and effecting relative traverse between said members in a direction parallel to said reference plane and slightly inclined from a perpendicular to the axis of said gear member in a direction to cause cramping between the teeth of said members.

References Cited in the file of this patent

UNITED STATES PATENTS

| | | |
|---|---|---|
| 2,165,386 | Klamp | July 11, 1939 |
| 2,317,161 | Witham | Apr. 22, 1943 |
| 2,411,973 | Mentley | Dec. 3, 1946 |
| 2,557,462 | Praeg | June 19, 1951 |

FOREIGN PATENTS

| | | |
|---|---|---|
| 418,130 | Italy | Feb. 5, 1947 |